United States Patent [19]

Teramachi

[11] Patent Number: 4,636,094
[45] Date of Patent: Jan. 13, 1987

[54] STRAIGHT-SLIDING ROLLER BEARING AND STRAIGHT GUIDE APPARATUS

[76] Inventor: Hiroshi Teramachi, 34-8, Higashitamagawa 2-chome, Setagaya-ku, Tokyo, Japan

[21] Appl. No.: 779,758

[22] Filed: Sep. 24, 1985

[30] Foreign Application Priority Data

| Sep. 27, 1984 | [JP] | Japan | 59-200377 |
| Oct. 16, 1984 | [JP] | Japan | 59-215216 |
| Oct. 16, 1984 | [JP] | Japan | 59-215217 |
| Oct. 23, 1984 | [JP] | Japan | 59-221231 |

[51] Int. Cl.⁴ .............................................. F16C 29/06
[52] U.S. Cl. .................................................... 384/44
[58] Field of Search ...................... 308/6 C, 6 R, 6 A; 464/168; 384/44

[56] References Cited

U.S. PATENT DOCUMENTS

| 4,253,709 | 3/1981 | Teramachi | 308/6 C |
| 4,296,974 | 10/1981 | Teramachi | 308/6 C |
| 4,348,064 | 9/1982 | Teramachi | 308/6 C |
| 4,496,196 | 1/1985 | Teramachi | 308/6 C |
| 4,518,206 | 5/1985 | Teramachi | 308/6 C |
| 4,553,794 | 11/1985 | Teramachi | 308/6 C |
| 4,558,910 | 12/1985 | Teramachi | 308/6 C |

Primary Examiner—Lenard A. Footland
Attorney, Agent, or Firm—Armstrong, Nikaido, Marmelstein & Kubovcik

[57] ABSTRACT

A straight-sliding roller bearing and a straight guide apparatus mounted with the roller bearing are provided. The straight-sliding roller bearing comprises a slide base having loaded roller rolling faces and non-loaded roller rolling faces provided on a front end of a horizontal portion and on a lower end of a vertical portion, a pair of roller retainers attached to the front end of the horizontal portion and the lower end of the vertical portion of the slide base for forming endless roller raceways in conjunction with the loaded roller rolling faces and non-loaded rolling faces, a raceway base having rolling faces opposite to the respective loaded rolling faces, and a number of rollers recirculating in the respective endless roller raceways to support loads, wherein the slide base is provided with an attaching portion projecting from one end of the horizontal portion in the opposite direction to the horizontal portion. The upper face of the attaching portion is in the same plane with an upper face of the horizontal portion, whereby height and preload of the upper face of the horizontal section can be adjusted by exerting a pushing pressure on the attaching section.

12 Claims, 25 Drawing Figures

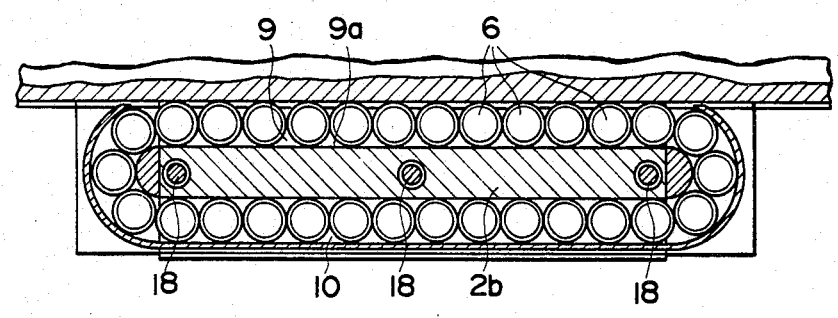
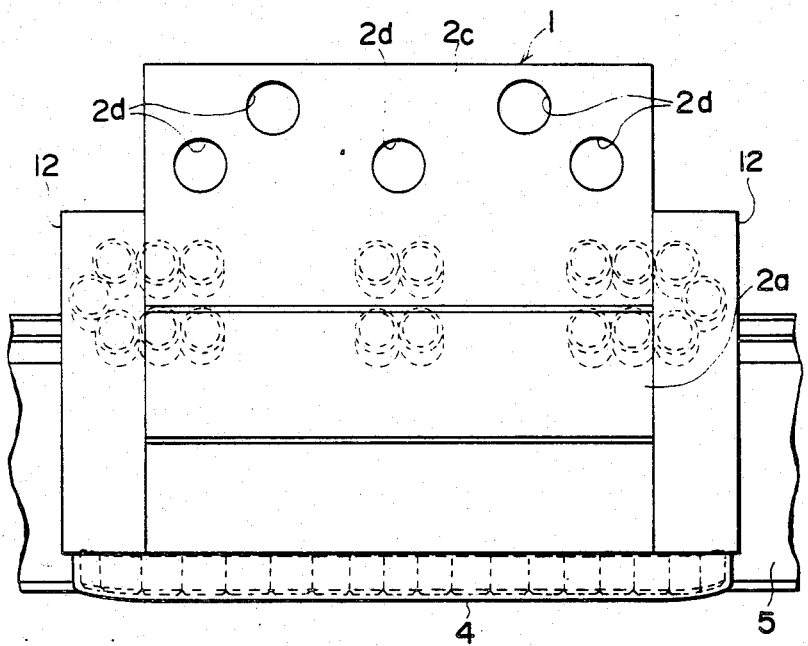

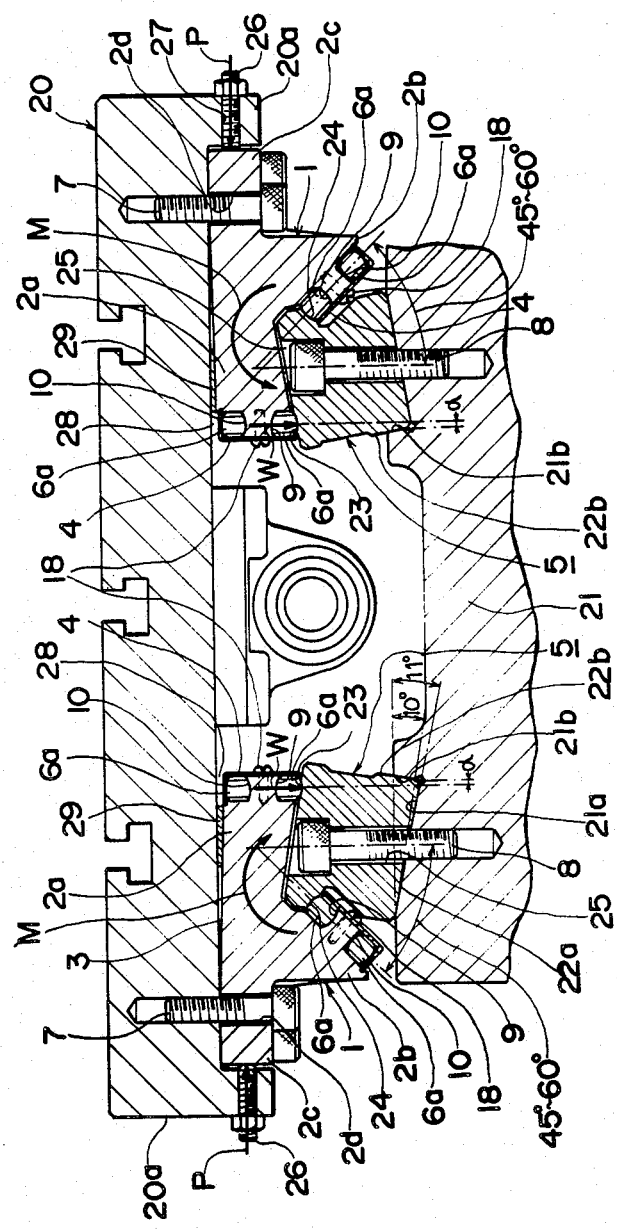

STRAIGHT-SLIDING ROLLER BEARING AND STRAIGHT GUIDE APPARATUS

FIELD OF THE INVENTION AND RELATED ART STATEMENT

This invention relates to a straight-sliding roller bearing and straight guide apparatus used, for example, in a slide section of machine tool, industrial robot, etc. of the NC type for straightly guiding a sliding movable body.

The bearing of the above type which achieves straight guide action is widely used in a slide section of various industrial machines and apparatus, such as a machining center, an X-, Y-, Z-axis unit of NC type machine tool, an extrusion molding machine, and an industrial robot.

In most of the conventional bearings and straight guide apparatus of this type, rolling balls are used as means provided between a slide base and raceway base for guiding the slide base. The slide base or raceway base generally is laterally symmetrical in sectional shape. Both sleeve portions of the slide base are usually configured so as to hold both shoulder sections of the raceway base under their arm portions.

Because of such a configuration, the slide base is in contact with the raceway base via the balls; thus, to make the bearing support a heavy load it is necessary to elongate a load zone or area of the endless ball raceway and correspondingly increase the number of balls being accommodated in this load zone. This causes a problem in that the slide base becomes unnecessarily large. Further, loads in the vertical and horizontal directions are supported in the conventional mechanism by forming a pair of groove-like rolling faces in each shoulder section of each raceway base, causing load balls provided on the slide base to roll on respective rolling faces, and holding each shoulder section of the raceway base between a pair of load ball trains. Thus, the conventional configuration had the drawbacks that a groove must be machined four times in each raceway base and four endless ball raceways must be formed in the slide base. Many man-hours are required to machine the raceway base or slide base, particularly, to grind and finish the grooves. Additionally, an increasing number of parts makes the work of assembly complex. These all result in a high manufacturing cost. In addition, because the balls make point contact there was another drawback that the mechanism is weak under a heavy load.

OBJECTS AND SUMMARY OF THE INVENTION

It is an object of the present invention to provide a straight-sliding roller bearing which supports loads in both vertical and horizontal directions acting on a slide base by means of rollers which bearing will exert sufficient strength even against a heavy load and obviates the need to enlarge the slide base unnecessarily.

It is another object of the present invention to provide a straight-sliding roller bearing which lessens groove-machining work on a difficult to machine raceway base and endless raceway-forming work on a slide base, reduces man-hours for grinding and finishing grooves of the slide base or raceway base, reduces the number of parts, and simplifies attaching work of the bearing to a movable body and fixed bed.

It is a further object of the present invention to provide a straight-sliding roller bearing which permits adjustment of height and preload of a slide base according to service through simple manipulation, and lowers a load acting on the point of contact due to a horizontal load as small as possible thereby to improve the stability of sliding motion and to permit the mechanism to be relatively small.

It is a still further object of the present invention to provide a straight guide apparatus in which a straight-sliding roller bearing having such features as above is assembled.

In brief, the present invention provides a straight-sliding ball bearing of the configuration characterized in that a slide base having a horizontal portion and a vertical portion extending downwardly from one end of the horizontal portion is provided with an attaching portion projecting from the one end of the horizontal portion in the opposite direction to the extension of the horizontal portion. The upper face of the attaching portion is in the same plane as the upper face of the horizontal portion. The line of load action between a loaded roller rolling face formed on an extended face of the horizontal portion and an upper rolling face of a raceway base opposite to that loaded roller rolling face is aligned at a downward angle. A line of load action between a loaded roller rolling face formed on an inwardly directed face of the vertical portion and a lower rolling face of the raceway base opposite to that loaded roller rolling face is aligned at an upward angle and inclined with respect to a line perpendicularly intersecting the plane including the upper face of the horizontal portion. A pushing pressure acting from the side of a movable body against an upper portion of the slide base, or from the attaching portion toward the horizontal portion is generated at the time of fixing the slide base to the movable body via the attaching portion thereby permitting adjustment of height and preload of the upper face of the horizontal portion.

The present invention provides a modified straight-sliding roller bearing which uses preferably cylindrical rollers as roller means, and is characterized in that the axis of rotation of each of the cylindrical rollers provided on the extended face of the horizontal portion for supporting loads is inclined downwardly and inwardly relative to the plane including the upper face of the horizontal portion, so that the line load of action between the loaded roller rolling face and the upper rolling face of the raceway base opposite to that loaded roller rolling face is inclined with respect to a line perpendicularly intersecting the plane including the upper face of the horizontal portion. The line of load action between the loaded roller rolling face formed on the inwardly directed face of the vertical portion and the lower rolling face of the raceway base opposite to that loaded roller rolling face is inclined with respect to the line perpendicularly intersecting the plane including the upper face of the horizontal portion, whereby adjustment of height and preload of the upper face of the horizontal portion can be performed effectively by exerting a pushing pressure from the side of the movable body on an upper portion of the slide base.

The present invention provides a straight guide apparatus characterized in that to assemble the foregoing straight-sliding roller bearing in between the movable body and a fixed body such as a bed, the fixed bed is formed with an inclined face inclined with respect to the plane including the upper face of the horizontal portion of the slide base and a locking face extending perpendicularly with respect to the inclined face. The raceway base is fixed obliquely to the fixed bed by means of fixing bolts penetrating substantially perpendicularly with respect to the plane including the upper face of the horizontal portion of the slide base.

The straight-sliding roller bearing may be modified according to the present invention in such a way that cylindrical rollers or spherical rollers are used as roller means. Additionally, the line of load action between a loaded roller groove formed in the extended face of the horizontal portion and the rolling face of the raceway base opposite to that loaded roller groove is aligned so as to perpendicularly intersect the plane including the upper face of the horizontal portion, and the line of load action between a loaded roller groove formed in the inwardly directed face of the vertical portion and the rolling face of the raceway base opposite to that loaded roller groove is inclined with respect to the line perpendicularly intersecting the plane includng the upper face of the horizontal portion.

The straight guide apparatus may be modified according to the present invention in such a way that a difference in inclination angle is provided between an attaching reference face of the fixed bed and an attaching face of the raceway base so that a slight gap is formed between the movable body and the upper face of the horizontal portion of the slide base by fixing the raceway base to the fixed bed by means of fixing bolts, and the attaching portion and movable body are fixed together by means of the attaching bolts with a shim inserted in that gap.

Preferably, according to the present invention, the line of load action between the loaded roller rolling face formed on the inwardly directed face of the vertical portion and the lower rolling face of the raceway base opposite to that loaded roller rolling face is inclined at an angle ranging from about 45 to 60 degrees with respect to the line perpendicularly intersecting the plane including the upper face of the horizontal portion with a line of action of pushing pressure acting from the side of the movable body on an upper portion of the slide base being located above the rolling face of the raceway base, and the line of load action between the loaded roller rolling face formed on the extended face of the horizontal portion of the slide base and the upper rolling face of the raceway base opposite to that loaded roller rolling face being displaced toward the fixed bolt from the line of intersection between the inclined face and locking face of the fixed bed.

According to the straight-sliding roller bearing of the present invention, by the use of the rollers in place of balls the area of supporting loads is increased, particularly, a large load can be supported in the vertical direction. Because the rollers are interposed between the two loaded roller rolling faces on the extended face of the horizontal portion and on the inwardly directed face of the vertical portion of the slide base and the rolling faces on the upper and side portions of the raceway base, the numbers of the load grooves and rolling faces can be reduced, thereby lessening assembly work. At the time of fixing the slide base to the movable body, a pushing pressure is given from the side of the movable body toward an upper portion of the slide base, or from the attaching portion to the horizontal portion thereby applying a turning force to the slide base, whereby adjustment of a preload can be achieved simply according to a desired service. Further, because the raceway base is fixed with an inclination with respect to the upper face of the attaching portion of the slide base, adjustment of height can be achieved easily, the point of action of contact of the slide base with the raceway base can be lowered, and a load acting on the point of action of contact due to a horizontal load can be reduced also, thereby improving stability.

Furthermore, from the features that (a) the cylindrical rollers are used as roller means, (b) the axis of rotation of each of the cylindrical rollers provided on the extending face of the horizontal portion for supporting loads is inclined downwardly and inwardly relative to a plane including the upper face of the horizontal portion so that the line of load action between the loaded roller rolling face and the upper rolling face of the raceway base opposite to that loaded roller rolling face is inclined with respect to the line perpendicularly intersecting the plane including the upper face of the horizontal portion, and (c) the line of load action between the loaded roller rolling face formed on the inwardly directed face of the vertical portion and the lower rolling face of the raceway base opposite to that loaded roller rolling face is inclined with respect to the line perpendicularly intersecting the plane including the upper face of the horizontal portion, the rollers can move on the inclined rolling faces provided on the raceway base. Consequently, adjustment of height and preload of the upper face of the horizontal portion of the slide base can be achieved simply and effectively, the point of action of contact of the slide base with the raceway base can be lowered efficiently, the load acting on the point of action of contact due to a horizontal load can be reduced remarkably, the stability of sliding motion of the slide base can be improved, and the whole mechanism can be made smaller.

BRIEF DESCRIPTION OF THE DRAWINGS

FIG. 4 is a sectional view taken along line II—II of FIG. 2;

FIG. 5 is a plan view corresponding to FIG. 2;

FIG. 25 is a sectional view showing the third embodiment of the straight-sliding roller bearing and straight guide apparatus according to the present invention.

DETAILED DESCRIPTION OF THE PREFERRED EMBODIMENTS

Figure 1:
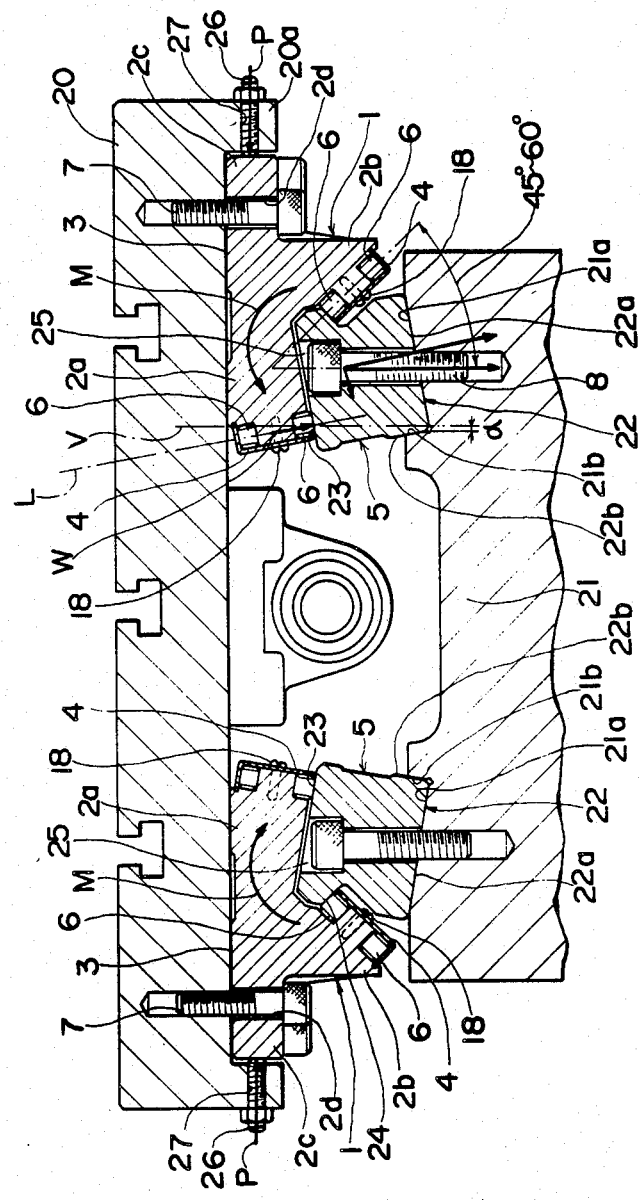
FIG. 1 is a sectional view of a straight-sliding roller bearing and straight guide apparatus according to the first embodiment of the present invention.

The present invention will now be described in detail with reference to its preferred embodiments shown in the drawings.

FIGS. 1 through 19 show a straight-sliding roller bearing and a straight guide apparatus according to the first embodiment of the present invention.

As shown in FIGS. 2 through 6, the straight-sliding roller bearing of the first embodiment comprises a slide base 1 of substantially inverted L-shaped cross section which consists of a horizontal portion 2a and a vertical portion 2b extending downwardly from one end of the horizontal portion 2a. The base 1 is attached at its upper face 3 to a movable body 20 such as a table by means of attaching bolts 7. A pair of roller retainers 4 are attached, respectively, to the inwardly directed face 3a of the horizontal portion 2a and the downwardly and inwardly directed face 3b of the vertical portion 2b of the slide base 1. A raceway base 5 is fixed to a fixed or stationary body 21 such as a machine bed by means of fixing bolts 8 serving as fixing means so that it is positioned below the horizontal portion 2a. A number of cylindrical rollers 6 circulate inside endless roller raceways formed by the horizontal portion 2a and vertical portion 2b and the retainers 4 to bear and support loads exerted between the slide base 1 and raceway base 5.

Figure 7:
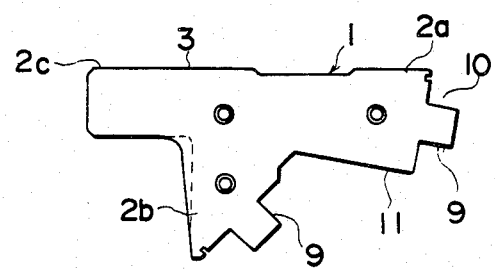
FIG. 7 is a front view of a slide base in the first embodiment.
Figure 8:
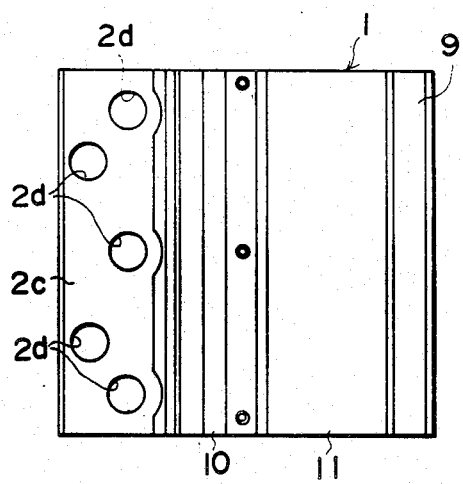
FIGS. 8 and 9 are a bottom view and side view, respectively, corresponding to FIG. 7.
Figure 9:
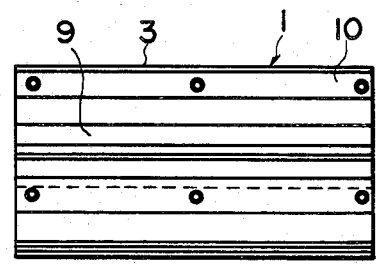

As shown in FIGS. 7 through 9, the slide base 1 has loaded zones of endless roller raceways extending along the longitudinal direction of the base 1, respectively, on the lower side of the inwardy directed face 3a of portion 2a and on the inner side of the downwardly and inwardly directed face 3b of the vertical portion 2b, each loaded zone including a loaded roller rolling face 9 with a flat running face 9a. The slide base 1 further has non-loaded zones of the endless roller raceways extending along the longitudinal direction of the base 1, respectively, on the upper side of the face 3a the horizontal portion 2a and on the outer side of the face 3b of the vertical portion 2b, each non-loaded zone including a groove-like non-loaded roller rolling face 10 corresponding to the foregoing loaded roller rolling face 9. In addition, an outwardly directed face 3c of the slide base 1 has an attaching portion 2c projecting in the opposite direction to the horizontal portion 2a, which is bored with attaching holes 2d for receiving attaching bolts 7. Regarding the cylindrical rollers 6 received on the face 3a of the horizontal portion 2a, as shown in FIG. 1, the axis of rotation of each of the rollers is inclined downwardly and inwardly relative to a plane including the upper face 3 of the horizontal portion. A line L of load action perpendicular to both the loaded roller rolling face 9 and a rolling face 23 on the upper face of the raceway base 5 opposite to that loaded roller rolling face 9 is inclined at an angle of about 10 degrees with respect to a line perpendicular to the plane of the upper face 3 of the horizontal portion.

The lower face of the horizontal portion 2a of the slide base 1 forms an inclined face 11 sloped downwardly towards the face 3a. While the slide base 1 of the foregoing configuration is fixed to the movable body 20 by the use of the attaching bolts 7, adjustment of height and preload can be achieved in the course of assembly by turning an adjusting bolt 26, which is threaded in a bore 27 in a portion of the side of the movable body 20 overhanging an upper portion of the slide base. The adjusting bolt 26 presses against the slide base in the direction toward the horizontal portion 2a.

On either end in the longitudinal direction of the slide base 1, a cover 12 made of synthetic resin as shown in FIGS. 12 through 17 is fixed by means of fixing bolts 14 penetrating through holes 13 bored therein.

Figure 2:
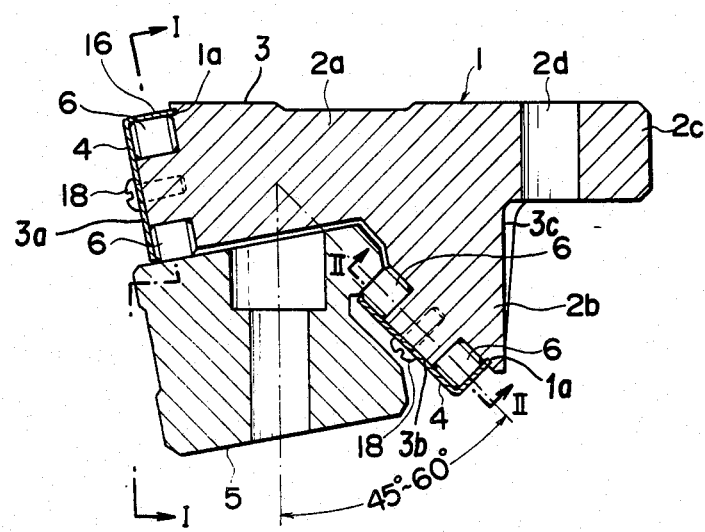
FIG. 2 is a sectional view of the straight-sliding roller bearing shown in FIG. 1.
Figure 3:
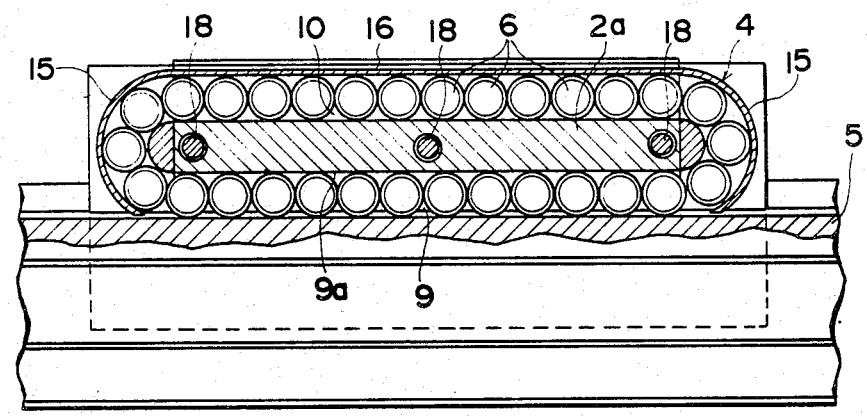
FIG. 3 is a sectional view taken along line I—I of FIG. 2.
Figure 6:
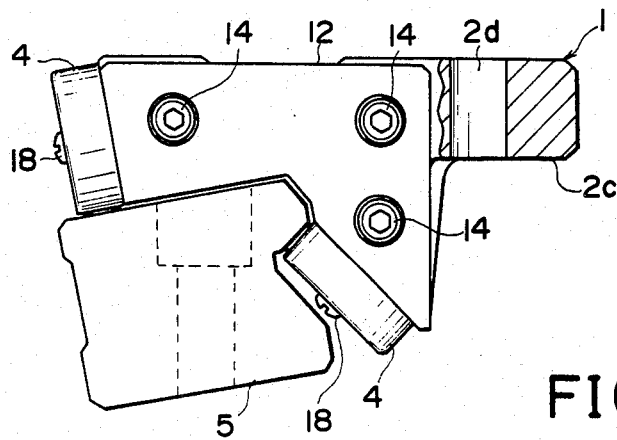
FIG. 6 is a side view, partly in cross section, corresponding to FIG. 5.
Figure 10:
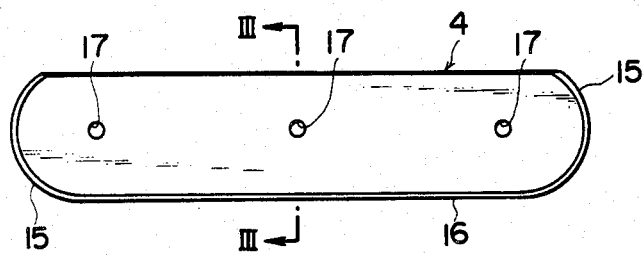
FIG. 10 is a front view of a roller guide in the first embodiment.
Figure 11:
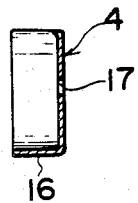
FIG. 11 is a sectional view taken along line III—III of FIG. 10.
Figure 12:
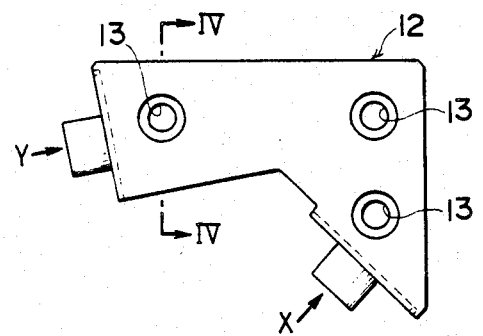
FIG. 12 is a front view of a cover in the first embodiment.
Figure 13:
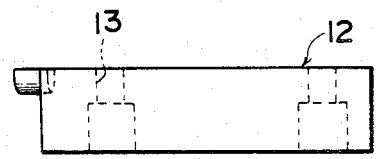
FIGS. 13 and 14 are a plan view and a rear view, respectively, corresponding to FIG. 12.
Figure 14:
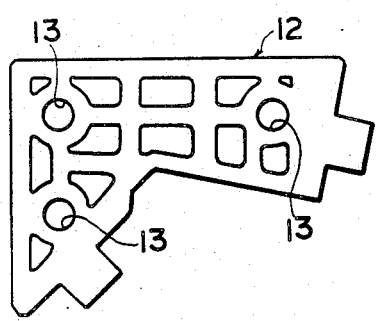
Figure 15:
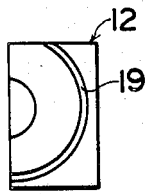
FIGS. 15 and 16 are fragmentary views in the directions of the arrows X and Y, respectively, in FIG. 12.
Figure 16:
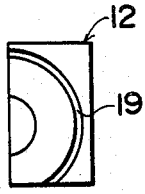
Figure 17:
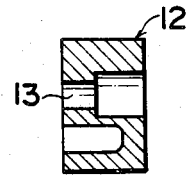
FIG. 17 is a sectional view taken along line IV—IV of FIG. 12.

As shown in FIGS. 10 and 11, the roller retainer 4 is formed by press molding of metallic plate or injection molding of hard synthetic resin, and has a substantially semicircular roller direction-changing/guiding portion 15 on each end thereof and a holding portion 16 of substantially L-shaped cross section between the roller direction changing/guiding portions 15. The holding portion 16 defines, in cooperation with the loaded roller rolling face 9 and groove-like non-loaded roller rolling face 10 formed on either of the face 3a of the horizontal portion 2a and the face 3b of the vertical portion 2b of the slide base 1, the loaded zone and non-loaded zone of the endless roller raceway, whereby each roller direction-changing/guiding portion 15 guides each cylindrical roller between the loaded zone and non-loaded zone of the endless roller raceway. In these drawings, reference numeral 17 indicates thru-holes bored in the holding portion 16 of the roller retainer 4. The roller retainer 4 is attached to the slide base 1 by means of screws 18 passing through these thru-holes 17 and being threaded in corresponding attaching holes (not shown) of the slide base 1. In the above process of assembly, as shown in FIG. 2, the roller direction-changing/guiding portion 15 of the roller retainer 4 is fitted and secured in a substantially semicircular attaching groove 19 (see FIGS. 15 and 16) formed in the cover 12. The holding portion 16 is fitted and secured in a straight attaching groove 1a formed in the slide base 1.

Figure 18:
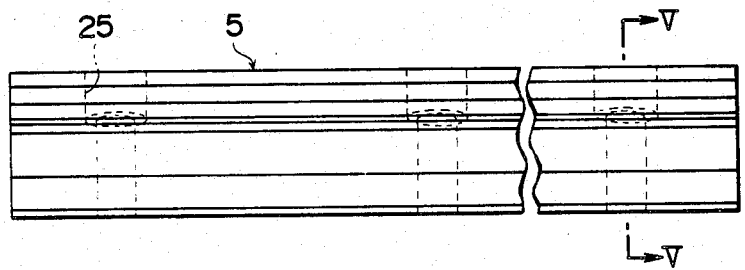
FIG. 18 is a side view of a raceway base in the first embodiment.
Figure 19:
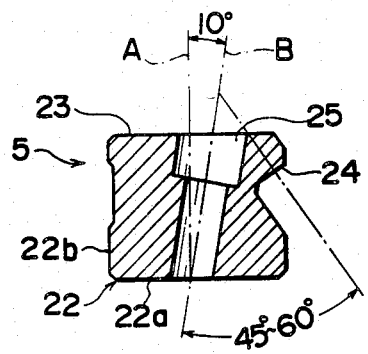
FIG. 19 is a sectional view taken along line V—V of FIG. 18.

As shown in FIGS. 18 and 19, the raceway base 5 is substantially rectangular in cross section and has an attaching face 22 consisting of a bottom face 22a and a lower portion of a side face 22b extending perpendicular from one end of the bottom face 22a. One shoulder portion of the raceway base 5 has an upper rolling face 23 facing the above obliquely in opposition to the loaded roller rolling face 9 formed on the lower side of the face 3a of the horizontal portion 2a of the slide base 1. The side face of the other shoulder portion has a V-shaped notch, defining an inclined face having a side rolling face 24 opposite to that loaded roller rolling face 9 formed on the inner side of the face 3b of the vertical portion 2b of the slide base 1. A center portion of the raceway base 5 has fixing means attaching holes 25 bored substantially vertically with respect to the plane including the upper face 3 of the horizontal portion of the slide base 1 when installed. The raceway base is fixed to the fixed bed 21 by screwing the fixing bolts 8 passing through the attaching holes 25 into the fixed bed 21. The raceway base 5 is configured as shown in FIG. 19 so that the upper rolling face 23 is parallel with an inclined-relative-to-horizontal bottom face 22a of the attaching face 22. Each attaching hole 25 is bored at an angle of about 10 degrees with respect to a line A perpendicular to the bottom face 22a of the attaching face 22. The side rolling face 24 is formed at an angle ranging from about 45 to 60 degrees with respect to the center line B of the attaching hole 25.

The straight guide apparatus completed by incorporation of the straight-sliding roller berings according to the first embodiment is composed, as shown in FIG. 1, of the pair of roller bearings each made up of the slide base 1, the pair of roller retainers 4, raceway base 5, and a number of cylindrical rollers 6; the fixed bed 21 such as a table provided with an attaching reference surface and fixed by means of the raceway bases 5 and fixing bolts 8; and the movable body 20 mounted and fixed by the use of the attaching bolts 7 fitted smoothly in the attaching holes 2d bored in the attaching portion 2c of each slide base 1.

In the foregoing first embodiment, the fixed bed 21 is defined by an inclined face 21a inclined at an angle of about 10 degrees with respect to the plane including the upper face 3 of the slide base 1 and a locking face 21b extending substantially perpendicularly with respect to the inclined face 21a from a lower side end thereof. The raceway base 5 is secured to the fixed bed 21 by means of the fixing bolts 8 after the attaching face 22 of the raceway base 5 has abutted on and engaged with the inclined face 21a and locking face 21b. As the result of the foregoing process of assembly, the upper rolling face 23 of the raceway base 5 inclines at an angle of about 10 degrees with respect to the plane including the upper face 3 of the horizontal portion of the slide base 1, the line L of load action of the rollers provided on the face 3a of the horizontal portion 2a of the slide base 1 intersects a line perpendicular to the plane including the upper face 3 of the horizontal portion at an angle of about 10 degrees, and the line of load action of the rollers 6 provided on the face 3b of the vertical portion 2b of the slide base 1 intersects the center line B of the fixing means attaching hole 25 at an angle ranging from about 45 to 60 degrees. The adjusting bolt 26 threaded from the side of the movable body 20 for adjustment of a preload of the slide base 1 passes through a horizontal threaded screw hole 27 bored in a side end vertical portion 20a of the movable body 20 so that the tip end of the adjusting bolt 26 abuts on the side face of the attaching portion 2c of the slide base 1.

Accordingly, a line P of pushing action acting from the side of the movable body is against an upper portion of the slide base 1 is located above the rolling faces 23, 24 of the raceway base 5. Because of the pushing action of the adjusting bolt 26, a turning force as indicated by M in FIG. 1 results and a preload is applied to the assembly which can be regulated by the bolt 26. In the foregoing configuration, it is not necessary that the adjusting bolt 26 be attached horizontally, but it is sufficient that the line of pushing action of the adjusting bolt 26 be located above the upper rolling face 23.

Further, a line V perpendicular to the plane including the upper face 3 and passing through the points of load action on the loaded roller rolling face 9 formed on the face 3a of the horizontal portion of the slide base 1 and on the upper rolling face 23 of the raceway base 5 opposite to the loaded roller rolling face 9 is displaced slightly, a distance, toward the fixing bolt 8 from the line defined by the intersection between the two attaching faces 22a, 22b of the raceway base 5. Accordingly, no force component of drawing the fixing bolt 8 arises when a vertical load W acts on the point of load action and the assembly is held stably.

To complete and use the straight-sliding roller bearing and straight guide apparatus of the first embodiment having the foregoing configuration, the raceway bases 5 are assembled onto a straight-sliding table for guiding straight reciprocating motion of various machines and tools, as shown in FIG. 1, by fixing the bases 5 by means of the fixing bolts 8 to the inclined face 21a and locking face 21b, serving as the attaching reference surface, formed on the fixed bed 21 mounted on the machine or tool. The movable body 20 is attached by means of the attaching bolts 7 onto the upper faces 3 of the horizontal portions 2a of both slide bases 1 forming the bearing slidable along the raceway bases 5. The attaching face 22 of the raceway base 5 is first caused to abut on and engage with the inclined face 21a and locking face 21b. The fixing bolts 8 are passed through the attaching holes 25 bored in the raceway base 5 and screwed into the stationary body 21. When the fixing bolts 8 are tightened, the fastening force of the fixing bolts 8 is divided into orthogonal force components acting, respectively, on the inclined face 21a and locking face 21b. As a result, the raceway base 5 touches closely the locking face 21b and the straightness of the raceway base 5 is maintained. After the raceway base 5 has been attached, the rollers 6 on the side of the slide base are engaged with the upper rolling face 23 and side rolling face 24 of the raceway base 5, and the adjusting bolts 26 screwed from the side of the movable body 20 are turned so that their line P of pushing action is located above the upper rolling face 23 of the raceway base 5. As a result, the rollers 6 move on the upper rolling face 23 of the raceway base 5, whereby a desired height and preload are ensured according to the desired service.

Figure 23:
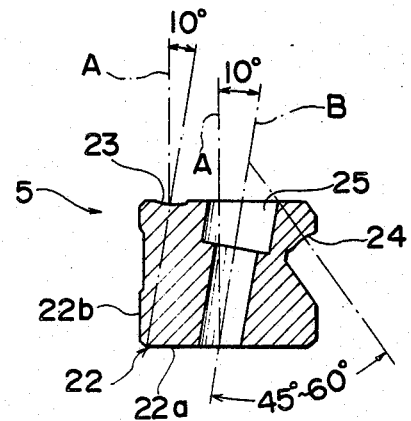
FIG. 23 is a sectional view taken along line VI—VI of FIG. 22.

FIGS. 20 through 24 show the straight-sliding roller bearing according to the second embodiment of the present invention and the straight guide apparatus in which the straight-sliding roller bearing is assembled. This second embodiment differs from the first embodiment. That is, regarding the slide base 1, spherical rollers 6a are used as roller means. The line W of load action between the loaded roller rolling face 9 of the load groove formed on the face 3a of the horizontal portion 2a and the rolling face 23 of the raceway base 5 opposite to the loaded roller rolling face 9 perpendicularly intersects the plane including the upper face 3 of the horizontal portion 2a. The line of load action between the loaded roller rolling face 9 of the load groove formed on the face 3b of the vertical portion 2b and the rolling face 24 of the raceway base 5 opposite to that loaded roller rolling face 9 is inclined with respect to the perpendicular line intersecting the plane including the upper face 3 of the horizontal portion 2a at an angle of 45 to 60 degrees. Further, regarding the raceway base 5, as shown in FIG. 23 before installation, the upper rolling face 23 and fixing means attaching hole 25 are inclined at an angle of about 10 degrees with respect to the perpendicular line A intersecting orthogonally the plane including the upper face 3 of the horizontal portion 2a of the slide base 1; and the line of load action of the spherical rollers 6a on the face 3a of the horizontal portion 2a of the slide base 1 is inclined at an angle of about 10 degrees with respect to line A. The side rolling face 24 is still inclined at an angle ranging from about 45 to 60 degrees with respect to the perpendicular line referenced when the raceway base 5 is attached to the fixed bed 21, namely, the center line B of the fixing means attaching hole 25. Consequently, the line W of load action of the spherical rollers on the face 3a of the horizontal portion 2a of the slide base 1 intersects orthogonally the plane including the upper face 3 of the horizontal portion 2a, and the line of load action of the spherical rollers on the face 3b of the vertical portion 2b is inclined at an angle ranging from about 45 to 60 degrees with respect to the plane including the upper face 3 of the horizontal portion 2a.

Figure 24:
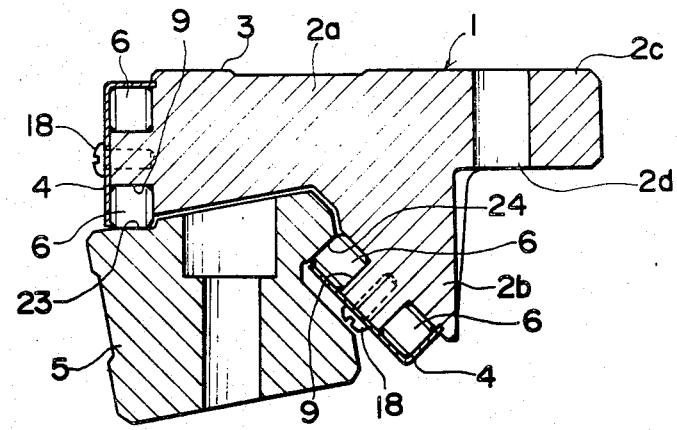
FIG. 24 is a sectional view, similar to that of FIG. 21, showing a modification of the straight-sliding roller bearing in the second embodiment.

FIG. 24 shows the configuration of the second embodiment, but the spherical rollers 6a are replaced with cylindrical rollers 6 as is the case of the first embodiment. The same replacement as above should be considered as involved in FIGS. 20 through 23.

Figure 20:
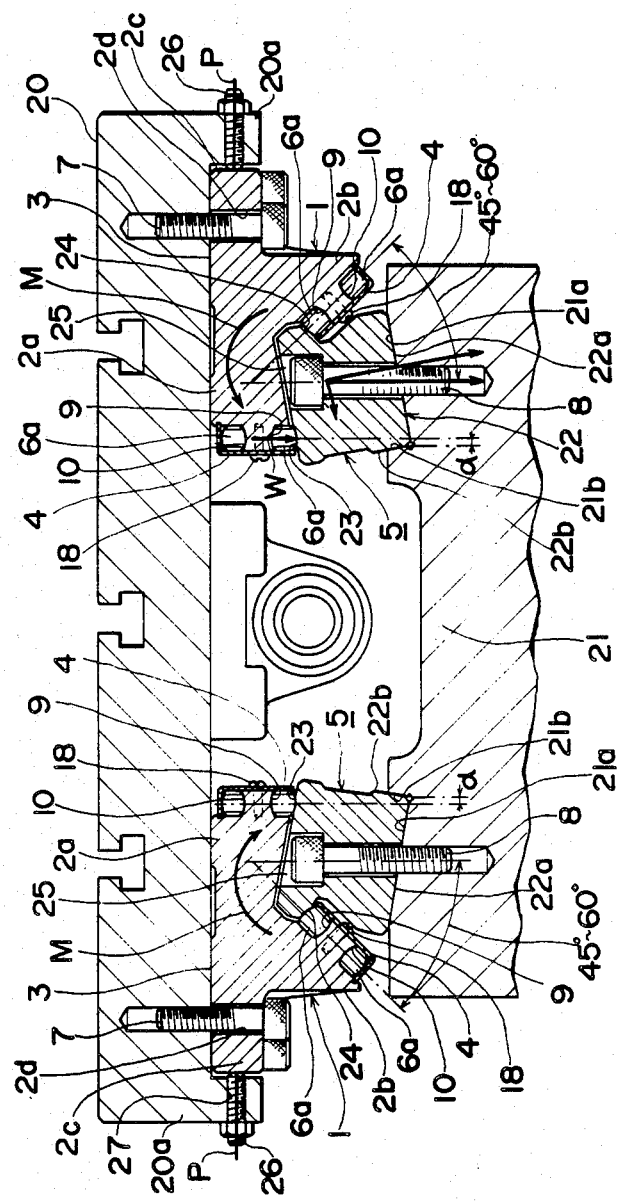
FIG. 20 is a sectional view showing the second embodiment of the straight-sliding roller bearing and stright guide apparatus according to the present invention.
Figure 21:
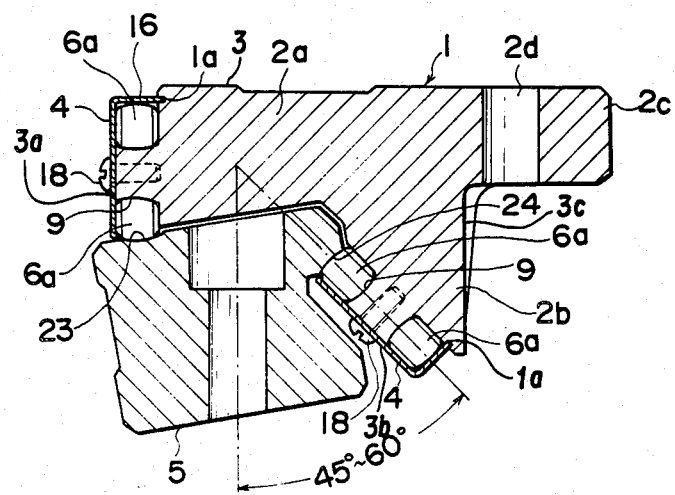
FIG. 21 is a sectional view of the straight-sliding roller bearing shown in FIG. 20.
Figure 22:
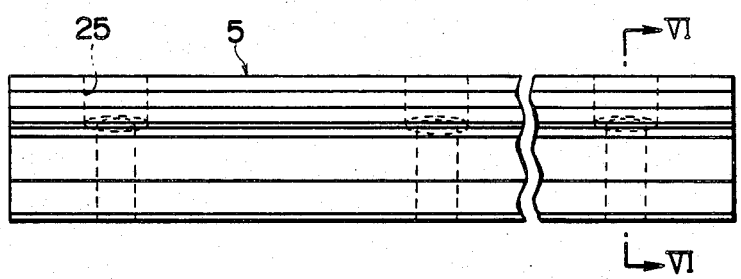
FIG. 22 is a side view of a raceway base in the second embodiment.

According to the straight-sliding roller bearing of the second embodiment and its modification, the line W of load action of the spherical rollers 6a or cylindrical rollers 6 on the face 3a of the horizontal portion 2a intersects orthogonally the plane including the upper face 3 of the horizontal portion 2a; thus, the load given from the movable body 20 is effectively supported by assembling the straight-sliding roller bearing in the straight guide apparatus as shown in FIG. 20.

FIG. 25 shows the straight guide apparatus in which the straight-sliding roller bearing according to the third embodiment of the present invention is assembled. This third embodiment differs from the second embodiment in that in assembling the straight-sliding roller bearing in between the movable body 20 and the fixed bed 21, a difference in inclination angle of about 1 degree is left between the inclined face 21a serving as the attaching reference surface of the fixed bed 21 and the bottom face 22a serving as the attaching face of the raceway base 5. Accordingly, the straight guide apparatus is completed by fixing the raceway base 5 to the fixed bed 21 by means of the fixing bolts 8 with leaving a slight gap 28 between the movable body 20 and the upper face 3 of the horizontal portion 2a of the slide base 5 and fixing the attaching portion 2c to the movable body 20 by means of the attaching bolts 7 while inserting a shim 29 in the gap 28.

According to the straigh guide apparatus of this third embodiment, the shim 29 is interposed between the upper face 3 of the horizontal portion 2a of the slide base 1 and the lower face of the movable body 20. Therefore, a large turning force M acts on the slide base 1 at the time of fastening the attaching bolts 7, as a result, a strong preload larger than that caused by the pushing action of the adjusting bolt 26 can be exerted, and adjustment of height can be achieved surely and easily depending upon the thickness of the shim 29.

Although the third embodiment is described hereinabove as including the spherical rollers 6a, it is of course possible to use the cylindrical rollers 6.

What is claimed is:

1. A straight-sliding roller bearing comprising
   a slide base having a horizontal portion and a vertical portion extending downwardly from one end of said horizontal portion, said horizontal portion having an inwardly directed face and said vertical portion having a downwardly and inwardly directed face, each face having defined thereon a loaded roller rolling face and a non-loaded roller rolling face,
   a pair of roller retainers attached to said inwardly directed face of said horizontal portion and said downwardly directed face of said vertical portion of said slide base forming respective endless roller raceways in conjunction with said loaded roller rolling faces and said non-loaded roller rolling faces,
   a raceway base having upper and lower rolling faces opposite to the respective loaded roller rolling faces formed on said horizontal portion and said vertical portion of said slide base, and
   a number of rollers circulating inside the respective endless roller raceways formed on said horizontal portion and said vertical portion of said slide base in conjunction with said roller retainers for supporting loads together with the respective loaded roller rolling faces on the side of said slide base and the respective rolling faces on the side of said raceway base,
   wherein
      said slide base is provided with an attaching portion projecting horizontally from said one end of said horizontal portion in the opposite direction to said horizontal portion and having an upper face in the same plane as an upper face of said horizontal portion,
      said inwardly directed face being aligned such that a line of load action between said loaded roller rolling face formed on said horizontal portion and the opposed upper rolling face of said raceway base extends at a downward angle,
      said downwardly directed is aligned such that a line of load action between said loaded roller rolling face formed on said vertical portion and said opposed lower rolling face of said raceway base extends upwardly and inclines with respect to a line perpendicularly intersecting said same plane, and
   means are provided for fixing said slide base to a movable body and for exterting a pushing pressure from the side of said movable body against an upper portion of said slide base in the direction from said attaching portion toward said horizontal portion to adjust the height of said horizontal section upper face and a preload.

2. A straight-sliding roller bearing as claimed in claim 1, wherein cylindrical rollers are used as said rollers, and the axis of rotation of each of said cylindrical rollers positioned on said horizontal portion for supporting loads inclines downwardly and inwardly so that the line of load action between said loaded roller rolling face formed on said horizontal portion and said opposed upper rolling face of said raceway base inclines with respect to said line perpendicularly intersecting said same plane.

3. A straight-sliding roller bearing as claimed in claim 1, wherein the line of load action between a load groove formed on said horizontal portion and said upper rolling face of said raceway base is aligned to perpendicularly intersect said same plane.

4. A straight-sliding roller bearing as claimed in claims 1, 2 or 3, wherein the line of load action between said loaded roller rolling face formed on said vertical portion and said lower rolling face of said raceway base is inclined at an angle ranging from 45 to 60 degrees with respect to the line perpendicularly intersecting said same plane.

5. A straight-sliding roller bearing as claimed in claims 1, 2, or 3, wherein the line of action of a pushing pressure acting from the side of said movable body on said slide base upper portion is located above said rolling faces of said raceway base.

6. A straight guide apparatus comprising
a slide base having a horizontal portion and a vertical portion extending donwardly from one end of said horizontal portion, said horizontal portion having an inwardly directed face and said vertical portion having a downwardly and inwardly directed face, each face having a loaded roller rolling face and a non-loaded roller rolling face,
a pair of roller retainers attached to said inwardly directed face of said horizontal portion and said downwardly directed face of said vertical portion of said slide base forming respective endless roller raceways in conjunction with said loaded roller rolling faces and said non-loaded roller rolling faces,
a raceway base fixed to a fixed bed by means of fixing bolts and having upper and lower rolling faces opposite to the respective loaded roller rolling faces formed on said horizontal portion and said vertical portion of said slide base, and
a number of rollers circulating inside the respective endless roller raceways formed on said horizontal portion and said vertical portion of said slide base in conjunction with said roller retainers for supporting loads together with the respective loaded roller rolling faces on the side of said slide base and the respective rolling faces on the side of said raceway base,
wherein
said slide base is provided with an attaching portion projecting horizontally from said one end of said horizontal portion in the opposite direction to said horizontal portion and having an upper face in the same plane as an upper face of said horizontal portion,
said inwardly directed face is aligned such that a line of load action between said loaded roller rolling face formed on said horizontal portion and the opposed upper rolling face of said raceway base extends at a downward angle,
said downwardly directed face is aligned such that a line of load action between said loaded roller rolling face formed on said vertical portion and said opposed lower rolling face of said raceway base extends upwardly and is inclined with respect to a line perpendicularly intersecting said same plane,
said fixed bed is defined by an inclined face inclined with respect to said horizontal portion upper face of said slide base and a locking face extending perpendicularly to said inclined face, and
said raceway base is fixed obliquely to said fixed bed by means of fixing bolts penetrating substantially perpendicularly to said same plane.

7. A straight guide apparatus as claimed in claim 6, wherein cylindrical rollers are used as said rollers, and the axis of rotation of each of said cylindrical rollers positioned on said horizontal portion for supporting loads inclines downwardly and inwardly so that the line of load action between said loaded roller rolling face formed on said horizontal portion and said opposed upper rolling face of said raceway base inclines with respect to the line perpendicularly intersecting said same plane.

8. A straight guide apparatus as claimed in claim 6, wherein the line of load action between a load groove formed on said horizontal portion and said upper rolling face of said raceway base is aligned so as to perpendicularly intersect said same plane.

9. A straight guide apparatus as claimed in claim 7, wherein a difference in inclination angle is provided between an attaching reference face of said fixed bed and an attaching face of said raceway base, said fixed bed and said raceway base are fixed together by means of fixing bolts with forming a slight gap between a movable body and said horizontal portion upper face of said slide base, and said attaching portion of said slide base and said movable body are fixed together by means of attaching bolts with interposing a shim in said gap.

10. A straight guide apparatus as claimed in claims 6, 7, 8 or 9, wherein the line of load action between said loaded roller rolling face formed on said vertical portion and said opposed lower rolling face of said raceway base inclines at an angle ranging from 45 to 60 degrees with respect to the line perpendicularly intersecting said same plane.

11. A straight guide apparatus as claimed in claims 6, 7, 8, or 9, wherein the line of action of a pushing pressure acting from the side of said movable body on said slide base upper portion is located above said rolling faces of said raceway base.

12. A straight guide apparatus as claimed in claims 6, 7, 8 or 9, wherein the line of load action between said loaded roller rolling face formed on said horizontal portion of said slide base and said upper rolling face of said raceway base is displaced toward the fixing bolts from the line of intersection between said inclined face and said locking face of said fixed bed.

* * * * *